United States Patent
Inka

[15] 3,648,890
[45] Mar. 14, 1972

[54] AUTOMATIC FEEDER AND TAPE WRAPPER

[72] Inventor: Egons Inka, Chicago, Ill.
[73] Assignee: Crane Packing Company, Morton Grove, Ill.
[22] Filed: Feb. 9, 1970
[21] Appl. No.: 9,598

[52] U.S. Cl..............................221/236, 221/212, 221/258
[51] Int. Cl............................................................B65h 5/00
[58] Field of Search..................221/224, 225, 236, 238, 264, 221/135, 213, 214, 216, 220, 262, 212, 208, 239, 243, 258, 271

[56] References Cited

UNITED STATES PATENTS

| | | | |
|---|---|---|---|
| 2,783,897 | 3/1957 | Farquharson | 221/216 X |
| 2,803,377 | 8/1957 | Wilson | 221/225 X |
| 3,494,393 | 2/1970 | Casanov | 221/212 X |

Primary Examiner—Samuel F. Coleman
Attorney—Charles F. Voytech

[57] ABSTRACT

An automatic workpiece feeder for a device which wraps a tape around a threaded portion of the workpiece. A vibratory feed hopper orients the workpiece correctly for acceptance by the tape wrapping device, and the oriented workpiece is conducted down a chute to the feeder. The latter engages a polygenal recess in the workpiece and holds the workpiece magnetically while it moves the workpiece into the tape wrapper, holds the piece against rotation while the tape is being wrapped around it, then withdraws the workpiece from the tape wrapper and strips the workpiece from the feeder to free the feeder for engaging the next piece. Movements of the feeder are effected by air cylinders controlled by solenoid-operated valves which are triggered by microswitches contacted sequentially by the moving parts of the feeder as each step in the operation of the feeder is concluded.

6 Claims, 20 Drawing Figures

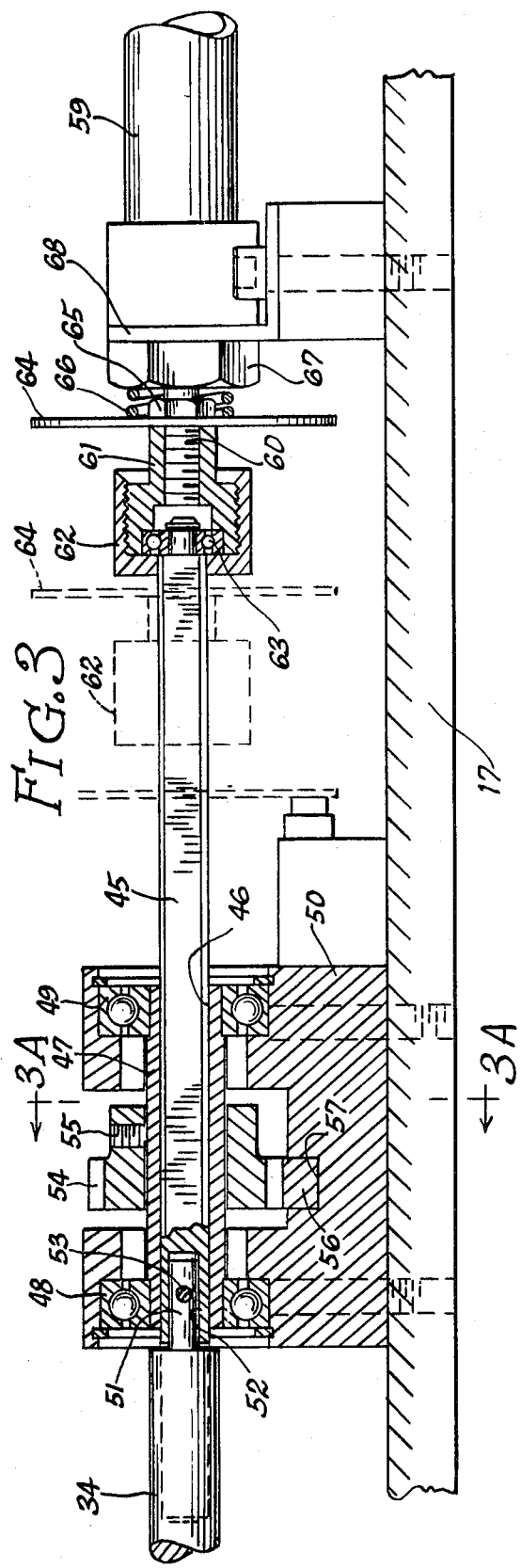
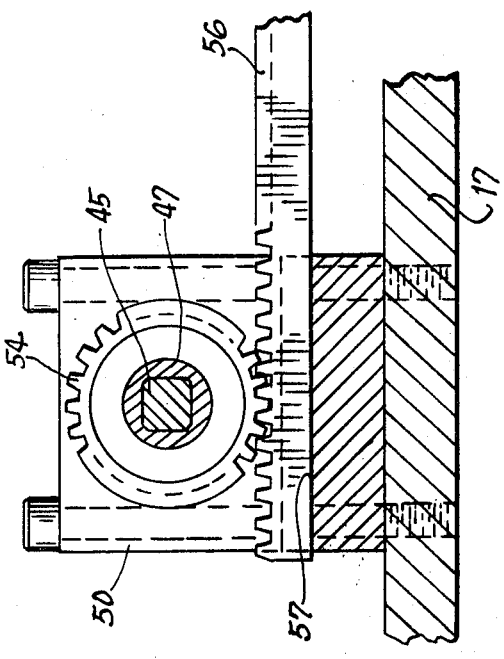

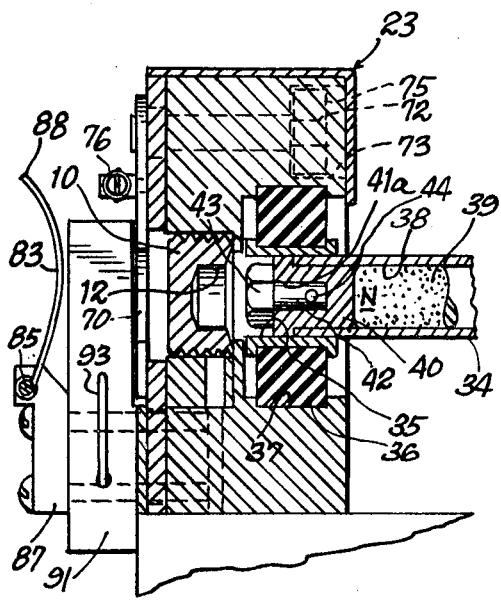
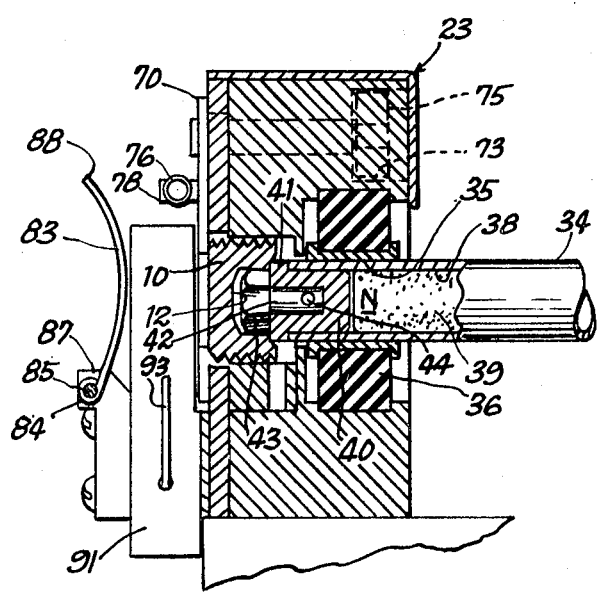
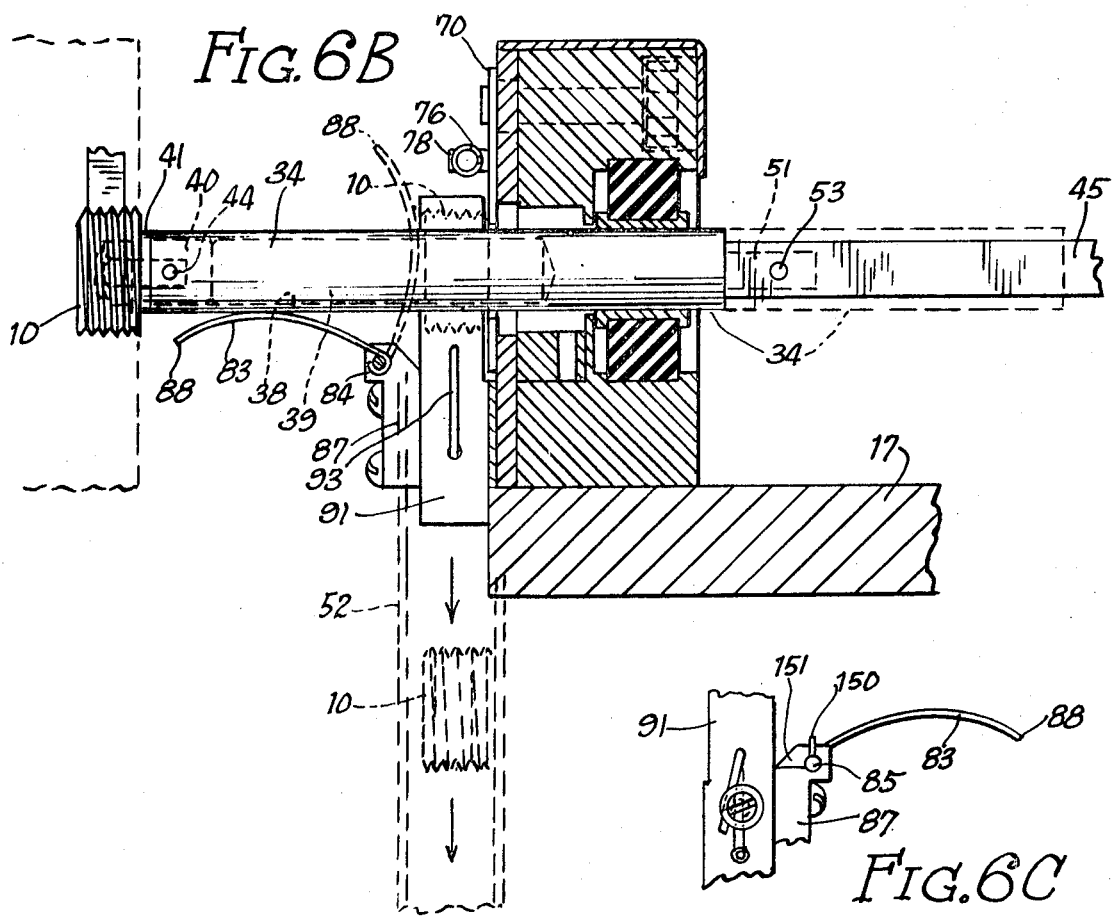

PNEUMATIC DIAGRAM
FOR AUTOMATIC FEEDER

AUTOMATIC FEEDER AND TAPE WRAPPER

This invention relates to automatic feed mechanisms to be used for sequentially orienting, selecting, advancing, holding, retracting and stripping a threaded workpiece with reference to a machine for wrapping a thread-sealing tape around the threads of the workpiece.

In a copending application of Robert A. Bilbrey, Ser. No. 615,519, filed Feb. 13, 1967, now U.S. Pat. No. 3,508,998 for Apparatus for Wrapping Tape Around Threaded Articles there is described a machine for automatically wrapping one or more turns of a thin unsintered polytetrafluoroethylene tape around the end region of the male threads on a plug or fitting for the purpose of providing an adherent clean sealing means for the fitting when it is in use. During the wrapping operation, the plug or fitting must be held against rotation while the tape is rolled into the threads.

It is contemplated that the tape will be applied to plugs and fittings which may then be stored in bulk in containers ready for assembly with other parts of a machine, or parts thereof, or for sale in retail stores. The quantities of such devices to be wrapped in one run may be in the hundreds of thousands and hence it is desirable to automate the feeding of the devices to the wrapping machine. Furthermore, automatic feeding of the parts reduces the cost of wrapping each threaded device and tends toward greater uniformity of the wrap.

It is therefore the principal object of this invention to provide for an externally threaded workpiece means for automatically sequentially orienting it, conducting it to a feed mechanism, selecting one from a stack, advancing the selected one toward a work station on a tape wrapping machine, holding it against rotation, retracting it, and stripping it from the feed mechanism.

It sometimes occurs that the tape wrapping machine does not function properly and thereby fails to make an acceptable wrap on the workpiece. It is therefore a more specific object of this invention to provide means, in an automatic workpiece feeding mechanism, for detecting and segregating a miswrapped workpiece from the acceptably wrapped workpieces.

One form of workpiece to which this invention is particularly suited is a threaded plug the outer end of which is formed with a polygonal recess for the reception of a correspondingly shaped wrench. Such recess forms a convenient means for engaging a holding device by which the workpiece may be both supported and held against rotation while the tape is wrapped around the threads of the workpiece.

It is accordingly another specific object of this invention to provide, in a device for automatically feeding workpieces to a tape wrapping machine, said workpieces having a polygonal recess in one end thereof, means shaped to enter said recess for supporting the workpiece and for holding it against rotation while the wrapping is in progress.

A further specific object is to provide means for automatically aligning a polygonal tool with a correspondingly shaped opening in a workpiece which is to be supported, advanced, held against rotation and retracted by said tool.

These and other objects of this invention will become apparent from the following detailed description of a preferred embodiment thereof when taken together with the accompanying drawings in which:

FIG. 1A is a perspective view of a workpiece to be fed by the feed mechanism of this invention;

FIG. 3 is a side elevational view in section, greatly enlarged of a portion of the mechanism of FIG. 1, taken along line 3—3 thereof;

Figure 1:
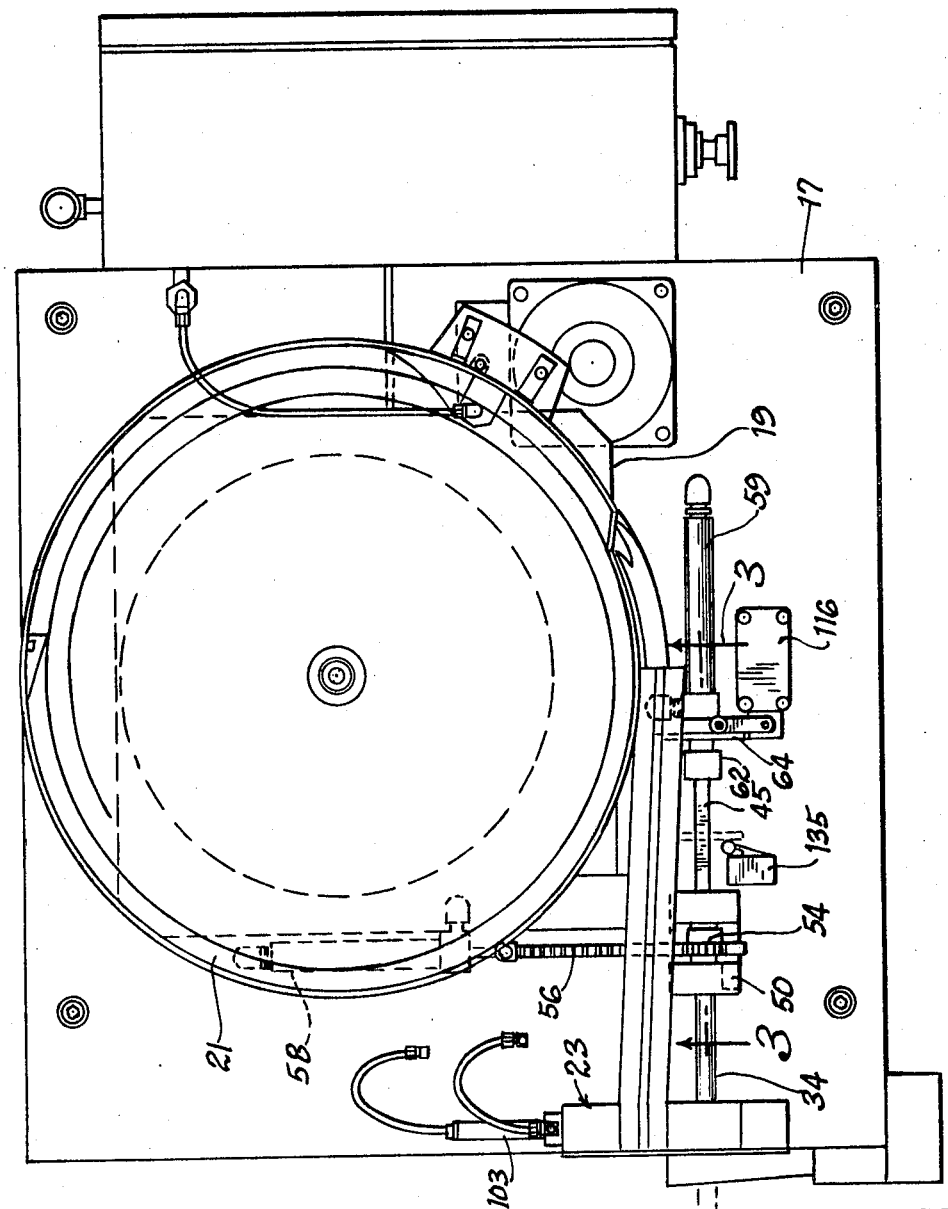
FIG. 1 is a plan view of the feed mechanism.
Figure 4:
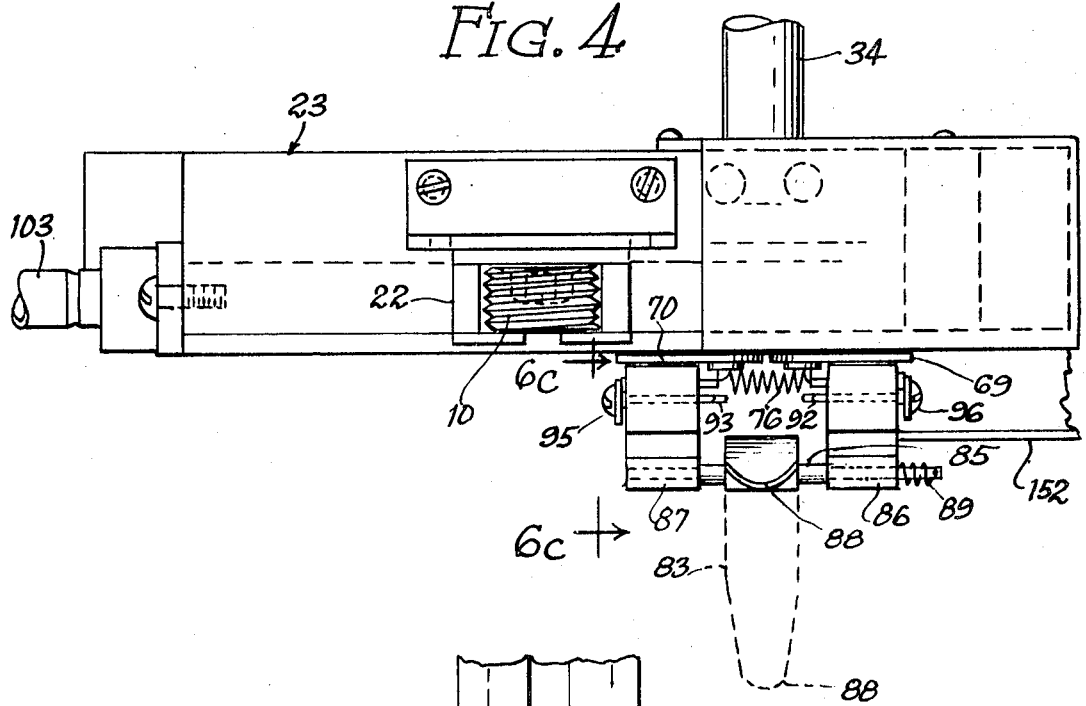
Figure 4A:
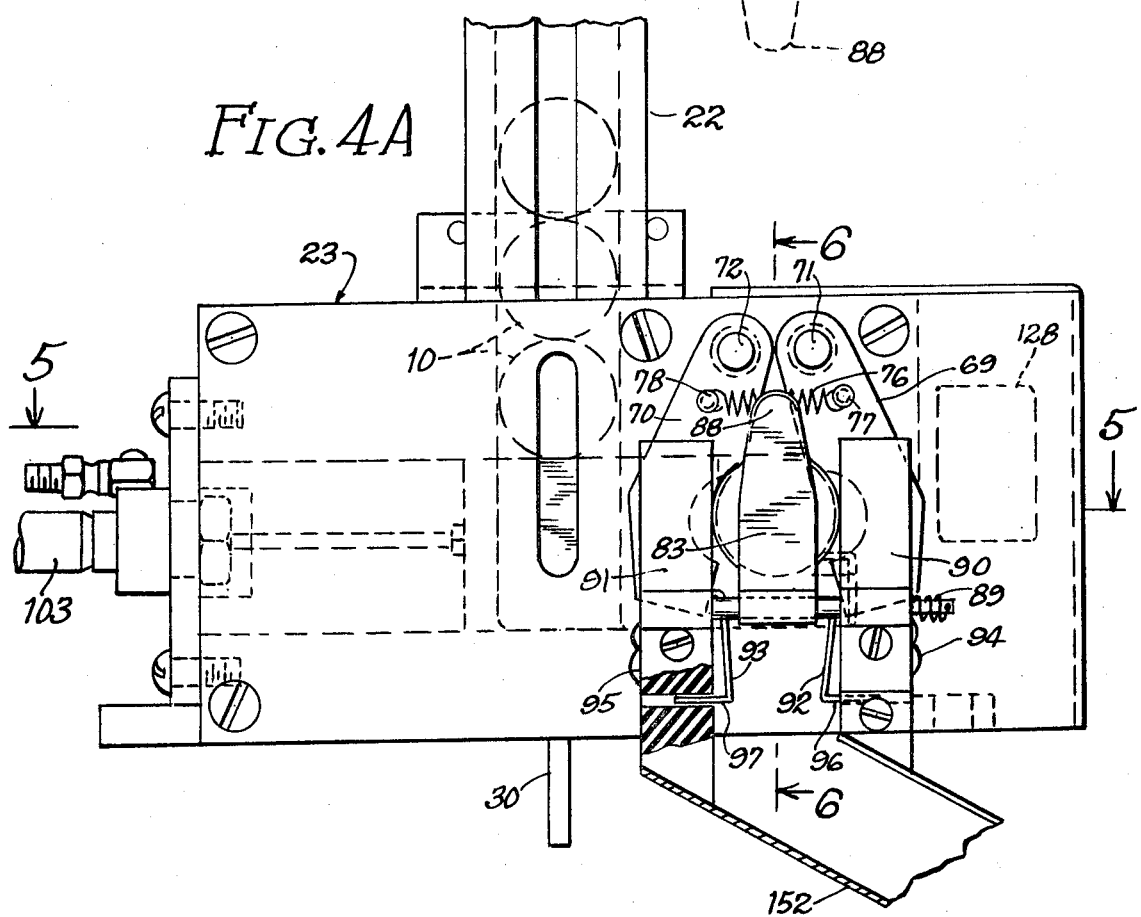
Figure 5:
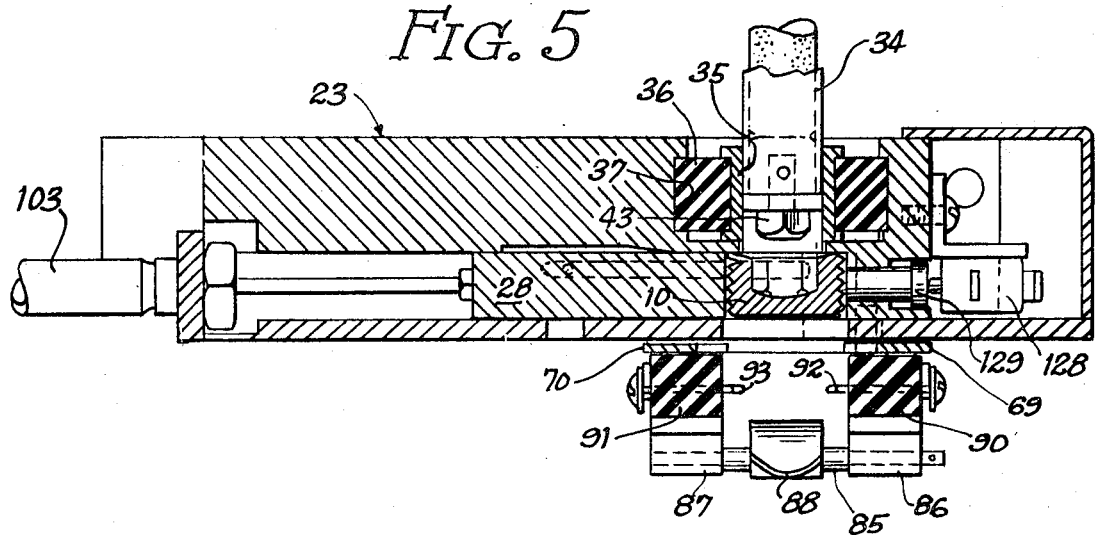
Figure 5A:
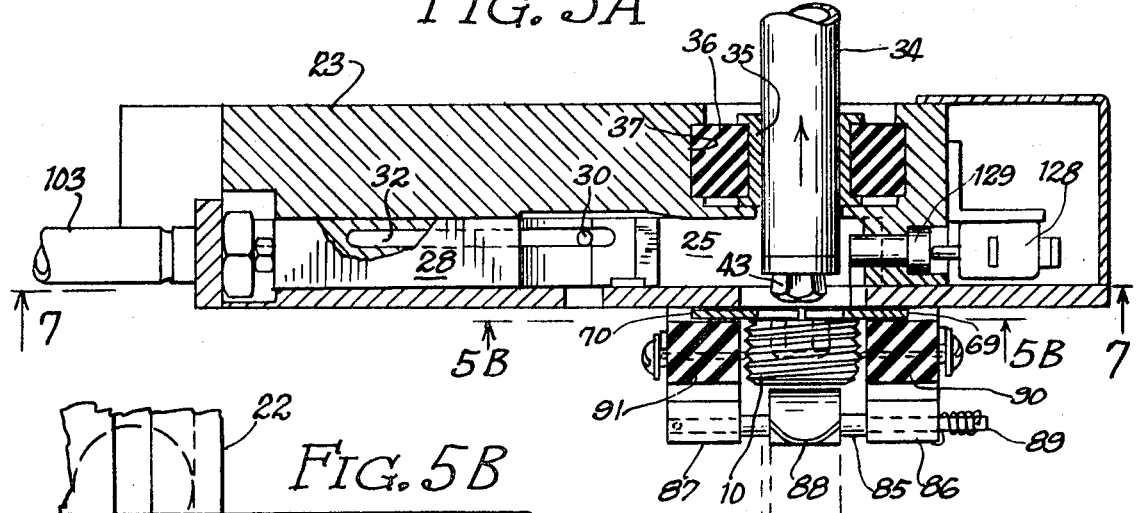
Figure 5B:
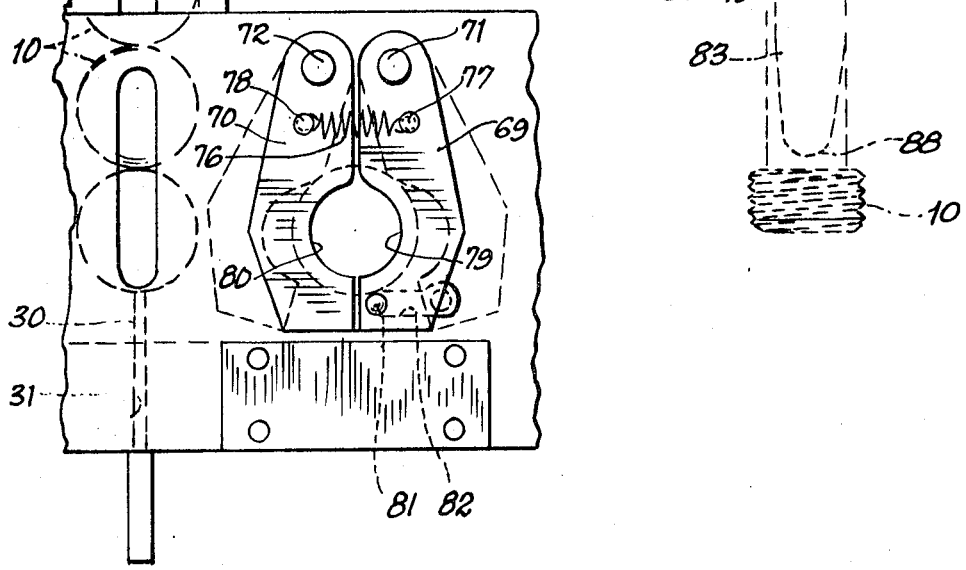
Figure 7:
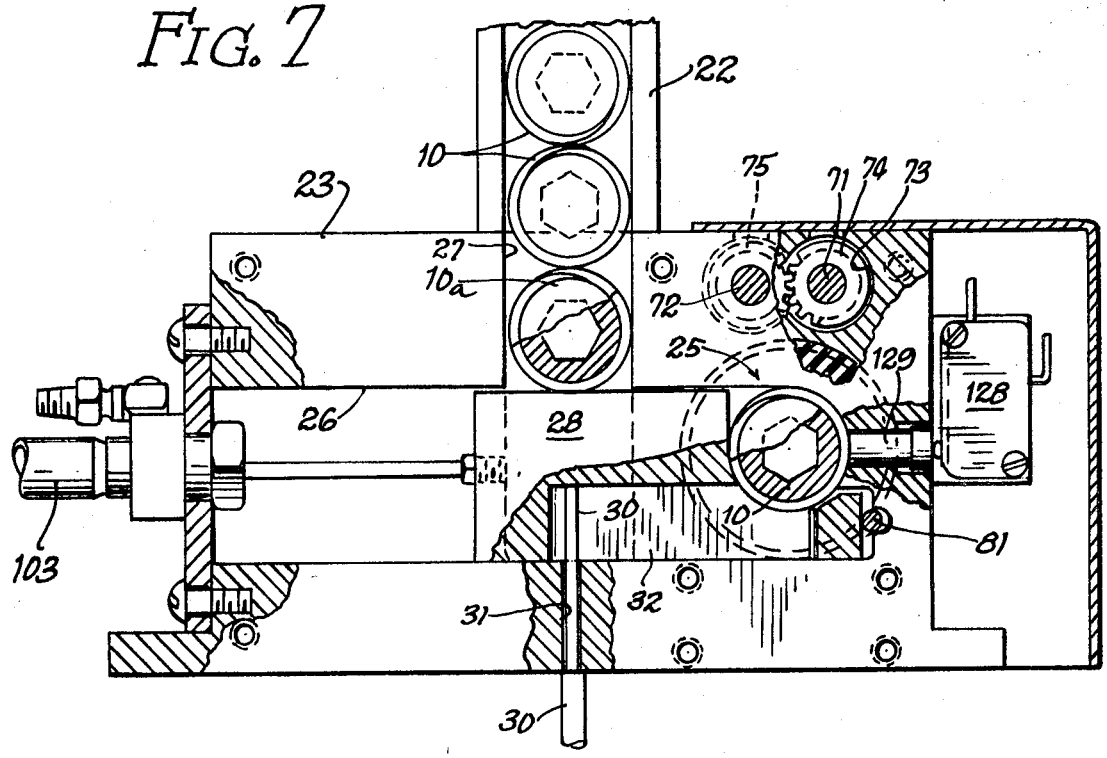
Figure 7A:
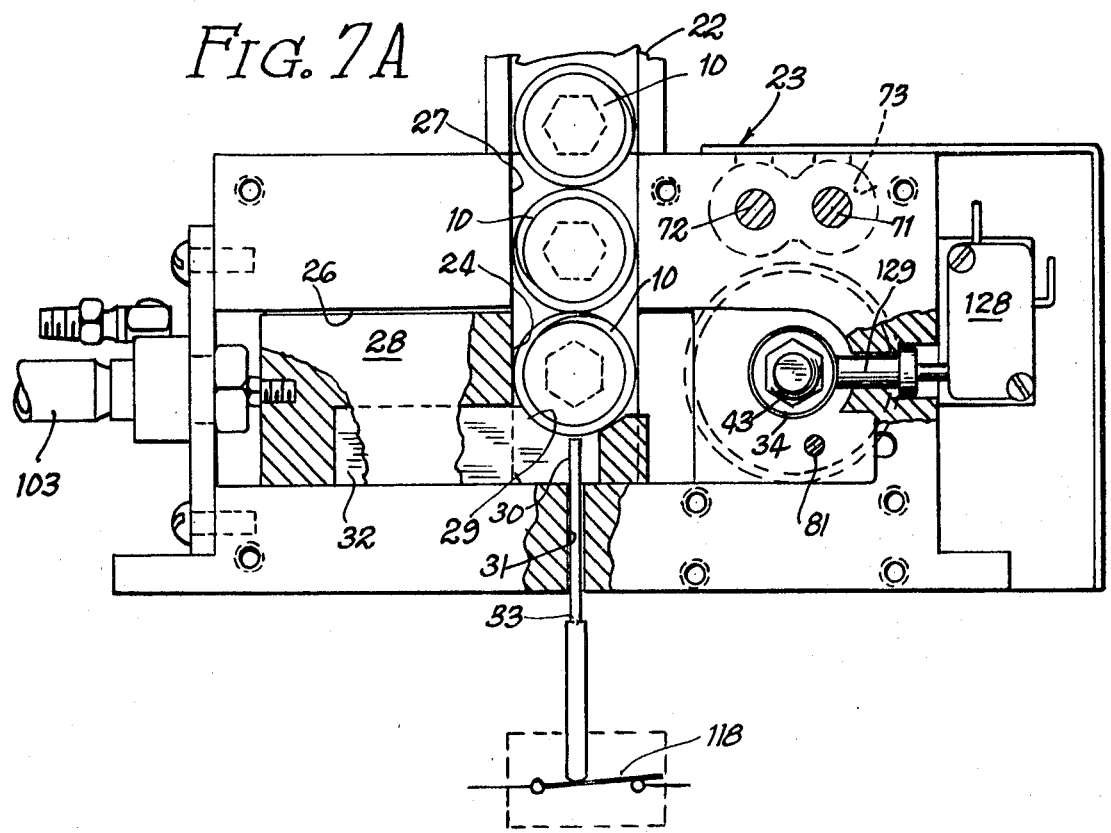
Figure 8:
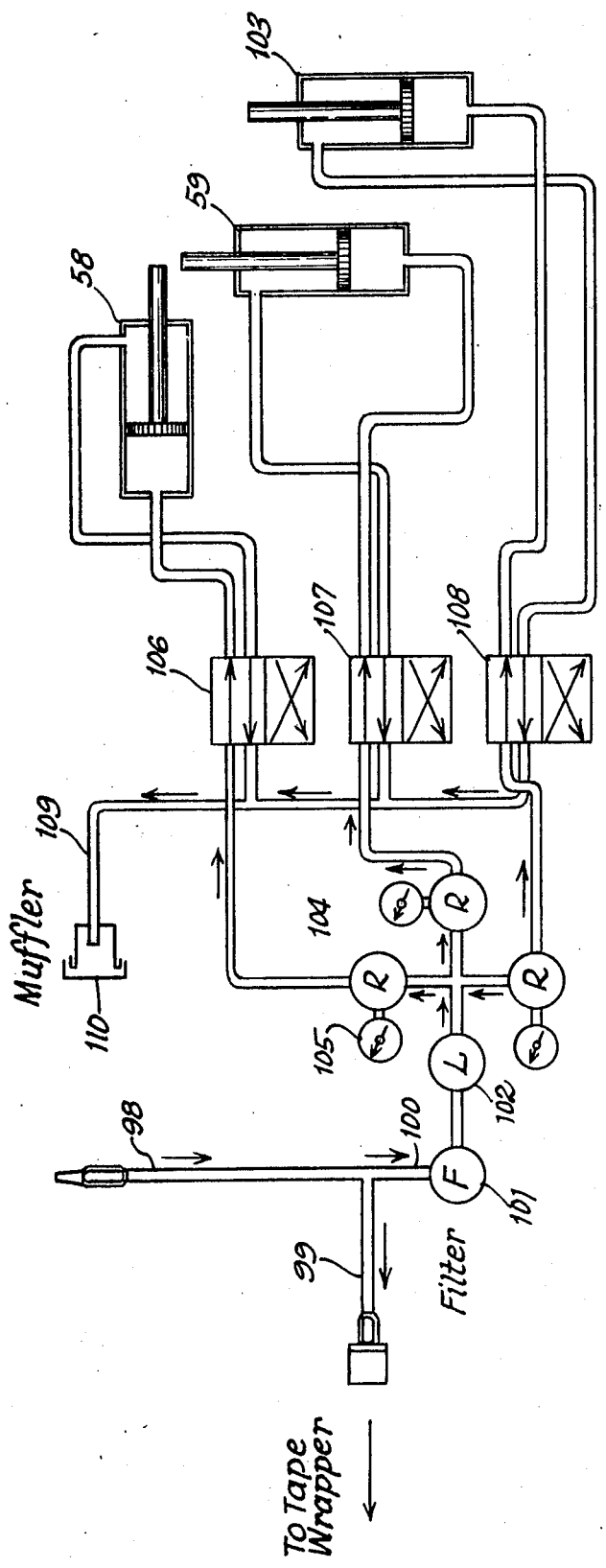
Figure 9:
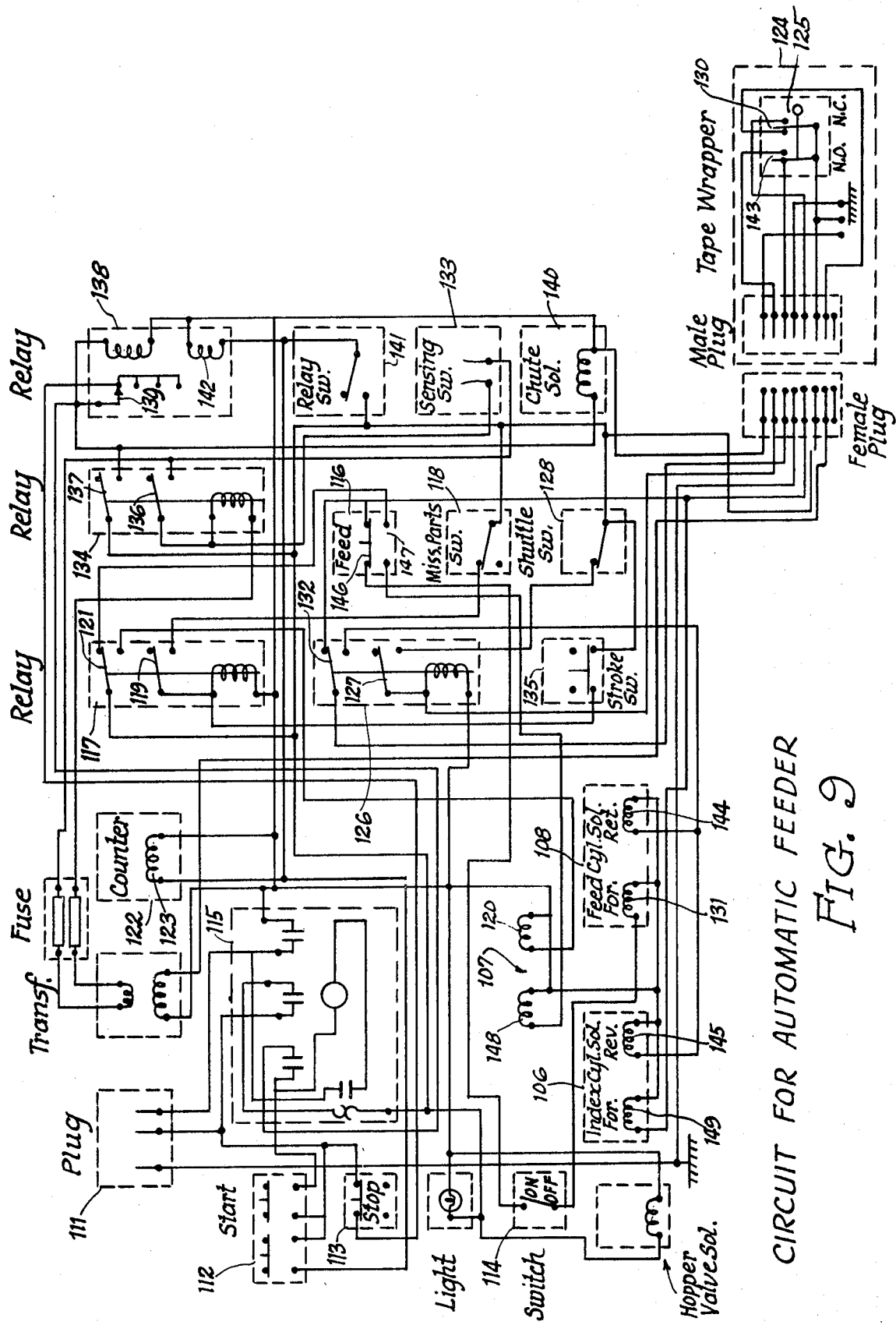
Figure 10:
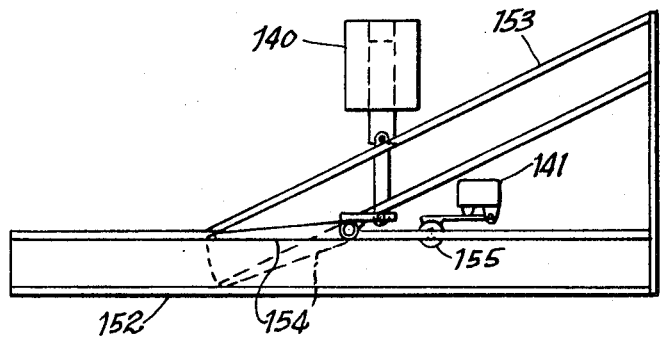
Figure 11:
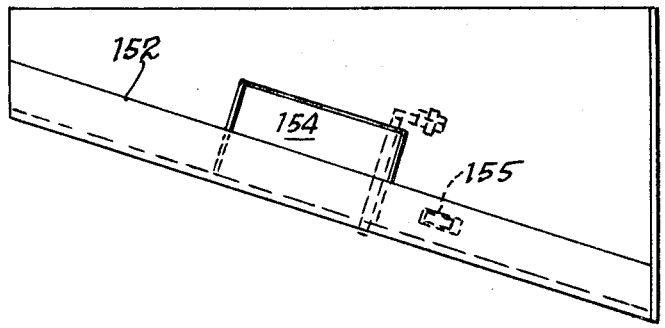

FIG. 3-A is a fragmentary end elevational view in section of the rotating means for the mechanism, the section being taken along line 3A—3A of FIG. 3;

FIG. 4 is a plan view, greatly enlarged of the selecting head of the feed mechanism;

FIG. 4A is a front elevational view of the selecting head of FIG. 4;

FIG. 5 is a plan view in section of the selecting head of FIG. 4, the section being taken along line 5—5 of FIG. 4A;

FIG. 5A is a plan view similar to that of FIG. 5, showing the selecting head in a different stage of operation;

FIG. 5B is a fragmentary front elevational view of the selecting head in the condition shown in 5A, the view being taken along line 5B—5B thereof;

FIG. 6 is a side elevational view in section of the selecting head of FIG. 4A, the section being taken along line 6—6 thereof;

FIG. 6A is a side elevational view of the selecting head of FIG. 6 showing the head in a different stage of operation;

FIG. 6B is a side elevational view of the selecting head of FIG. 6 in yet another stage of operation;

FIG. 6C is a side elevation of a portion of the head of FIG. 6 taken along line 6C—6C in FIG. 4;

FIG. 7 is a front elevational view of the selecting head of FIG. 5A with the front plate thereof removed and other parts cut away;

FIG. 7A is a front elevational view of the selecting head similar to FIG. 7 showing the head in a different stage of operation;

FIG. 8 is a diagram of the fluid circuits used in the feed mechanism of FIG. 1;

FIG. 9 is a wiring diagram of the electrical components used in the feed mechanism of FIG. 1; and FIGS. 10 and 11 are respectively plan and front elevational views of the chute for finished parts.

For purposes of illustration, the preferred form of the invention selected and shown herein will be described with reference to its application for feeding threaded plugs to a tape wrapping machine, the plugs having a hexagonal recess in one end into which is inserted a tool by which the plug is supported, advanced, held against rotation and retracted with reference to the wrapping machine. It is understood that with certain modifications in the form of the tool, the invention can be applied to other threaded workpieces.

By way of a general description, this invention comprises a vibratory workpiece orienting device connected by a gravity feed chute to the top of the feed head. A pneumatically operated slide selects one workpiece at a time and moves it laterally to a feed station in the head. A horizontally disposed feed rod is connected to a rotatable drive at one end and to a reciprocating drive at its other end, the rod being pushed toward the polygonal recess in the workpiece initially by a spring, the rotation of the rod indexing the rod relative to the recess and permitting the rod end to enter the recess. Upon entry of the rod into the recess, the rotation of the rod is stopped and thereafter the rod and workpiece are pushed axially by a pneumatic cylinder through the head to the work station at the adjacent tape wrapping machine. When the wrapping operation is completed, the rod is retracted through a stripping mechanism which strips the workpiece off the rod end and the workpiece then falls past an electrical sensing device which senses the adequacy of the tape wrapping operation. If the wrap is satisfactory, the workpiece is dropped through a chute into a container of satisfactory workpieces, but if an unsatisfactory wrap is sensed, a gate in the chute is opened to direct the workpiece to a reject container. Means are also provided for shutting down the entire mechanism if either the supply of pieces to the feed head fails, or a predetermined number of unwrapped or miswrapped pieces is detected by the electrical sensing device.

Since the recess is relatively shallow so that the workpiece cannot be securely held on the end of the feed rod, a magnet is placed on the end of the rod to hold the workpiece while it is on the rod. The location of the magnet on the rod end is critical for the successful entry of the rod end into the recess, and is a feature of this invention.

Referring now to the drawings for a detailed description of the invention and particularly to FIGS. 1 and 1A, the workpiece selected to illustrate this invention is shown in FIG. 1A and comprises a short cylindrical plug 10 having an external thread 11 and a recess 12 formed in the center of one end thereof, said recess having a polygonal form such as a hexagon to receive the end of a hexagonal tool by which the plug may be threaded into an opening in a fitting casing or the like. The recess is utilized by the feed mechanism to be hereinafter described as a means by which the plug is held, transported to and from a work station and also held against rotation while work is performed on the plug.

In the present instance, the work to be performed on the plug is that of wrapping a ribbon 13 of unsintered polytetrafluoroethylene around the threads for approximately 1¼ turns and rolling the tape into the threads so that it adheres thereto. The machine for applying and rolling the tape into the threads of the plug 10 is shown in dot-dash outline at 14 and is shown in detail in the aforementioned copending application of Robert A. Bilbrey, Ser. No. 615,519, filed Feb. 13, 1967. In that machine, the plug is held against rotation at the axis of a rotating platen which carries a roll of tape, means for cutting off and feeding a length of the tape to the plug and roller means for pressing the tape into the threads of the plug. A pair of rollers 15, 16 is shown schematically in FIG. 1 to indicate the approximate location of the work station of the wrapping machine.

Figure 2:
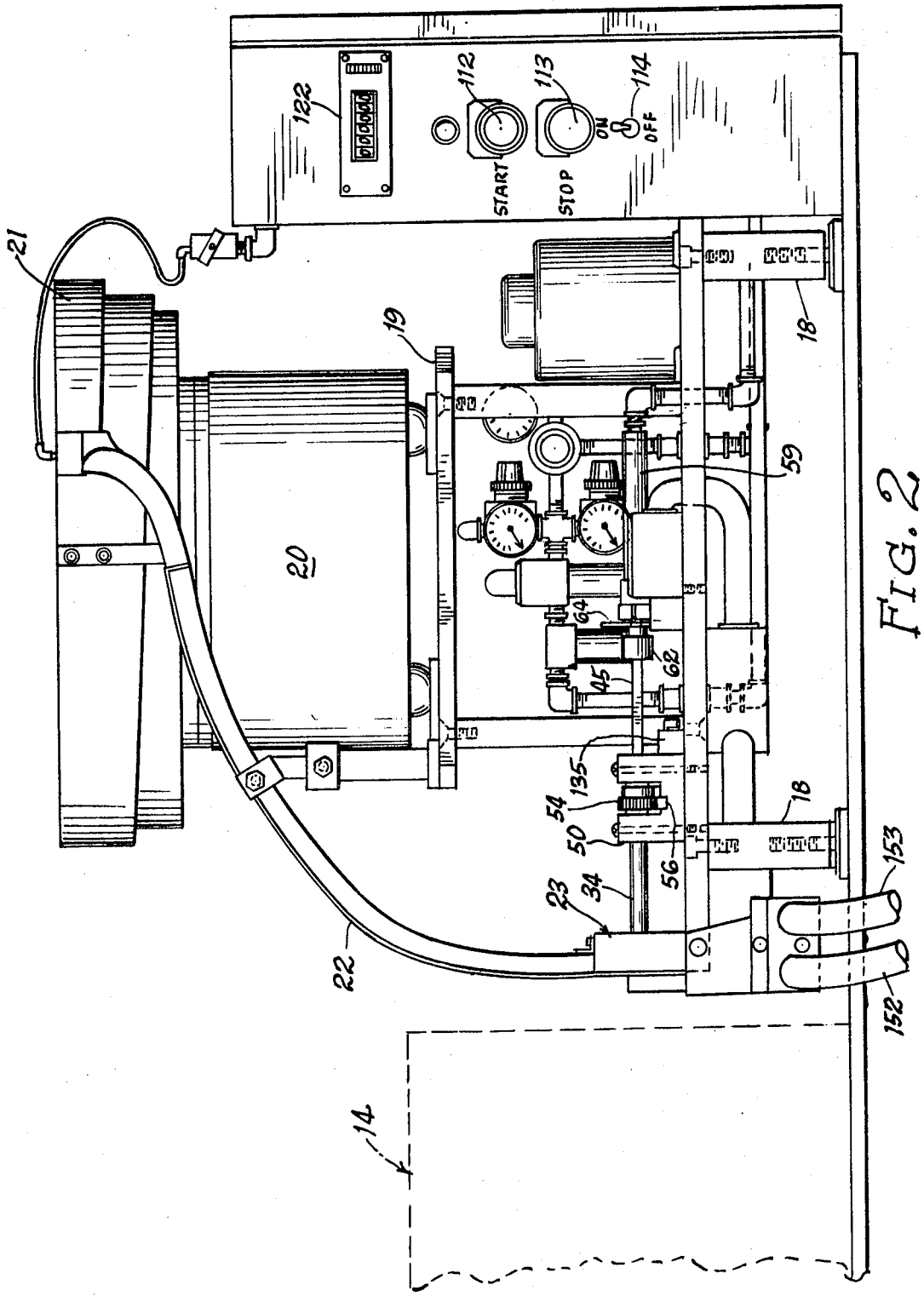
FIG. 2 is a side elevational view of the feed mechanism looking toward the top of FIG. 1.

Referring now to FIGS. 1 and 2, the feed mechanism of this invention is comprised, in general, of a base plate 17 appropriately supported on adjustable legs 18 and supporting an elevated platform 19 on which is mounted a vibratory feeding device 20 of known construction. A quantity of the plugs to be tape-wrapped is placed in the vibratory feeding device 20 and, through appropriate selecting mechanisms located in the output track 21, a series of plugs oriented to have the opening 12 thereof on the bottom is fed by gravity through a chute 22 to a feed head 23.

As shown in FIGS. 7 and 7A, feed head 23 has a receiving station 24 at the lower end of chute 22 and a feed station 25 horizontally displaced from receiving station 24. This is made necessary by the fact that the exterior surface of the plug 10 is threaded and accordingly, with the plugs oriented as shown in FIGS. 7 and 7A, when one plug falls upon the next plug, the threads of one interengage the threads of the other making it difficult thereafter to push the lowermost plug axially from under the adjacent plug. It is however a simple matter to push one plug sideways with respect to the plug above, since this involves only a slight axial movement of one or both of the plugs, the interengaged threads merely sliding along one another.

Accordingly, head 23 has a horizontally disposed recess 26 of substantially rectangular cross section which intersects a vertical recess 27 in head 23 connecting the receiving station 24 with the bottom of chute 22. Within recess 26 is a horizontally reciprocable plunger 28 of substantially rectangular cross section, the righthand end of which as viewed in FIG. 7 and 7A is cut away to form a notch having a concave bottom surface 29 on which the lowermost plug 10 normally rests.

It is contemplated, as will hereinafter become more clear, that the presence of a plug 10 in receiving station 24 will be sensed by a sensing device in the form of a pin 30 which is vertically reciprocable in an opening 31 in the bottom of head 23 and which extends upwardly through a slot 32 in the bottom of plunger 28 to contact the bottom of a plug 10 resting on concave surface 29. When no plug contacts the upper end of the pin 30, the latter rises to the position shown in FIG. 7, said position being determined by a shoulder 33 on said pin 30. It may be noted that the plug 10a resting upon the lowermost plug 10 in the receiving station 24 is supported by the top of plunger 28 when the latter has been moved to the right as viewed in FIG. 7 to transport the lowermost plug to the feed station 25. Plunger 28 and the pin 30 in slot 32 are also clearly shown in FIG. 5A.

Referring now to FIG. 5, a plug 10 is shown in the feed station wherein it is substantially axially aligned with the work station in the tape wrapping machine 14. It is now necessary to move the plug from the feed station to the work station in the tape wrapping machine. This plug transporting movement is effected by a plunger 34 which is reciprocable in a bushing 35 mounted in a resilient washer-shaped support 36 retained in a circular groove 37 in head 23 adjacent the feed station 25.

As shown in FIGS. 6, 6A and 6B, plunger 34 has an elongated recess 38 in which is received a permanent magnet 39 the lefthand end of which, as shown in FIGS. 6, 6A and 6B, contacts a plug 40 of magnetic material, said plug being formed with a peripheral flange 41 which abuts against the end of plunger 34, and being formed additionally with a central recess 41a in which is received the rounded stem 42 of a pin having a head 43 adapted to enter and engage the hexagonal recess 12 in plug 10. For purposes of illustration head 43 is shown hexagonal, but it may be formed with only three sides, if there is substantial misalignment between the recess 12 and head 43, to facilitate entry of head 43 into recess 12. The entire pin, including the hexagonal head 43 and stem 41, is of nonmagnetic material. Said pin, magnetic plug 40 and plunger 34 are secured together by a transversely disposed pin 44 passing through the plunger 34, magnetic plug 40 and rounded stem 42.

It has been found that if the hexagonal head 43 is of magnetic material, it is extremely difficult to have the head engage the hexagonal recess 12 inasmuch as the force of magnetism would cause the head to be attracted to the rim of the plug 10 surrounding the recess 12, and the hexagonal head 43 would therefore bear against the rim of the plug instead of entering recess 12, and would remain there until forcibly separated. By making the head of nonmagnetic material, however, the head can readily enter recess 12 before the flange 41 of the magnetic plug 40 is attracted to and engages the rim of plug 10 surrounding recess 12. Thus, head 43 supports the plug against falling off the end of plunger 34, as well as centers it with respect to said plunger, while the magnetic plug 40 holds the workpiece plug firmly in place. The hexagonal head 43 also prevents relative rotation of the workpiece plug 10 relative to plunger 34.

Referring now to FIGS. 1, 2 and 3, plunger 34 is connected at its righthand end, as viewed in these Figures, to a square section rod 45 axially slidable in a square opening 46 in a sleeve 47 mounted for rotation in spaced antifriction bearings 48 and 49 retained in appropriate recesses in a block 50 mounted on base plate 17. The connection between plunger 34 and rod 45 comprises a tongue 51 on plunger 34 received in a recess 52 in the lefthand end of rod 45, as viewed in FIG. 3, and a transverse pin 53 which passes through rod 45 and tongue 51.

Sleeve 47 is adapted to be rotated by a pinion 54 secured to sleeve 47 by a set screw 55 and meshing with a rack 56 reciprocable in a groove 57 in block 50.

It has been found necessary to rotate plunger 34 while said plunger 34 is in light resilient engagement with the workpiece plug 10 until the head at the end of plunger 34 is correctly indexed with respect to, and enters, recess 12 in the workpiece plug 10. It is the function of rack 56 and its driven pinion 54 to impart such rotation to plunger 34. Thus, as shown in FIG. 1, rack 56 is appropriately connected to a fluid pressure-operated cylinder 58 which, as will be more clearly explained hereinafter, is energized at the proper time to impart reciprocation to rack 56 to rotate pinion 54 and ultimately plunger 34.

The axial reciprocation of plunger 34 by which the workpiece plug 10 is advanced to the work station in the tape wrapping machine 14 is provided for by a fluid pressure-operated cylinder 59 (FIG. 3) the piston rod 60 of which is threaded at its free end to receive and engage with the threaded end 61 of a belled coupling 62. The righthand end, as viewed in FIG. 3, of rod 45 is connected through an antifriction bearing 63 to coupling 62. The inner and outer races of bearing 63 are appropriately secured against axial movement relative to rod 45 and coupling 62, respectively, so that said rod 45 is rotatable with respect to coupling 62, but is constrained to move axially with it. A circular plate 64, forming part of the control mechanism for the workpiece plug feed mechanism, is secured by a nut 65 against the threaded end 61 of coupling 62, said nut 65 also functioning as a lock nut for threaded end 61.

It has been found that when full fluid pressure is impressed endwise upon feed plunger 34, it is substantially impossible to align the hexagonal end of the plunger with the hexagonal opening in the workpiece plug. To remedy this situation, the controls for cylinder 59, as will hereinafter be more fully described, are such that when piston rod 60 is retracted, that is, moved to the right as shown in FIG. 3, fluid pressure is retained in the cylinder so that plunger 34 is substantially in the disengaged position shown in FIG. 5 with respect to the plug 10. When it is desired to engage head 43 of the plunger with recess 12 in a plug, the pressure is released and thereupon a spring 66 (FIG. 3) disposed between disc 64 and a nut 67 securing cylinder 59 to a bracket 68 is released, said spring having been compressed when the cylinder 59 was energized and moved the plunger to the right as shown in FIG. 3. Released spring 66 thus provides a resilient axial force upon plunger 34. The controls for the feed mechanism, as will be hereinafter fully explained, cause rack 56 to be reciprocated to turn plunger 34 while spring 66 is released, so that the combination of the spring pressure and rotation of the plunger results in an alignment and engagement between the hexagonal head on the plunger and the hexagonal recess in the workpiece plug 10.

Since plug 10 is held on the end of plunger 34 by a permanent magnet, external means is required to strip the plug off the end of plunger 34 when the wrapping operation is completed. The stripping mechanism is shown in FIGS. 5, 5A and 5B. Referring first to FIG. 5B, the stripper is comprised of a two-piece gate, the two pieces being hinged to separate and open to allow the workpiece plug and plunger to move out of the head 23 toward the tape wrapping machine 14 but to close around the plunger 34 on its return stroke so that the workpiece plug strikes the closed gate and is held while the plunger continues to retract through the head. Thus, the gate is comprised of two relatively flat strips 69 and 70 each of which is attached at its upper end to individual shafts 71 and 72 extending horizontally through the upper part of head 23 to the rear regions thereof (FIG. 6, 6A and 6B). In said rear region of the head 23, a recess 73 (FIG. 7) is formed in which are disposed two substantially identical gears 74, 75 meshing with one another and each secured for rotation with a shaft 71 or 72. Thus, when one of the flat strips 69 or 70 is rotated about its shaft, the other is rotated in an opposite sense through the intermeshing gears 74 and 75. A spring 76 has its end secured to pins 77 and 78 (FIG. 5B) mounted respectively on strips 69 and 70. Spring 76 constantly urges the strips 69 and 70 toward one another. Said strips 69 and 70 are notched as at 79, 80 to form a circular opening through which plunger 34 may reciprocate. Said opening, however, is of lesser diameter than the outside diameter of the workpiece plug 10 so that when the strips 69 and 70 are together and plunger 34 is retracted with a workpiece plug mounted on the end thereof, the workpiece plug will strike the strips 69 and 70 and will be pulled off the end of plunger 34.

Strips 69 and 70 are separated when a workpiece plug 10 is moved by plunger 28 into the feed position 25. This separation of the strips 69 and 70 is effected automatically by the use of a pin 81 secured to strip 69 and extending rearwardly through a slot 82 (FIG. 5B) in head 23 into the path of movement of plunger 28, which moves pin 81 to the right in FIG. 5B and separates the strips 69, 70. The cooperation between pin 81 and plunger 28 is shown in FIGS. 7 and 7A. It is apparent that withdrawal of the plunger to the left, as viewed in these figures, releases pin 81, and spring 76 is thereupon free to move the strips 69 and 70 together around plunger 34.

Because of the speed with which plunger 34 is retracted when the feed mechanism is in operation, there may be a tendancy for the wrapped plug to bounce off the strips 69 and 70. This motion of the plug is undesirable since it is intended that the plug move vertically downwardly past a device which detects a faulty wrap and then subsequently triggers a gate to send the faulty plug to a reject container. To secure better control of the plug, a hinged guard is provided which is pushed out of the way when the plug is moving toward the tape wrapping machine, but which follows the plug back into the head and prevents the released plug from moving in any but a controlled manner downwardly past the aforementioned detecting mechanism.

Referring to FIGS. 6, 6A, 6B and 6C, the guard is shown at 83 and comprises a strip of light but rigid material which has one end 84 curled around and welded to a shaft 85 extending horizontally between a pair of spaced bearings 86 and 87 (FIGS. 5, 5A) mounted on the front of head 23. The upper end of the guard 83 is curved, as shown at 88, so that when the guard is in its lowermost position, as shown in FIG. 6B, the end 88 of the guard will be cammed out of the way by the plug 10 and will not catch on the sides of the threads to exert a stripping force on the plug at an undesired location. On the return stroke of plunger 34, guard 83 is rotated in a clockwise direction, as viewed in FIG. 6 around and in front of plug 10 by a torsion spring 89 (FIG. 5A) mounted on the end of shaft 85, the rotation continuing until the guard is in an upright position in front of and spaced from the released or stripped plug. It is stopped in an upright position by a pin 150 (FIG. 6C) on shaft 85 engaging a shoulder 151 in bearing 87.

When the plug 10 is forcibly removed from the magnetic end of plunger 34 it falls down between blocks of insulating material 90 and 91 in which are retained a pair of inwardly projecting spring wire contacts 92 and 93 (FIGS. 4A and 5). One end 94 and 95 of each spring is fixed to the block of insulation material and the other end 96–97 is free to move laterally in an appropriate opening in the block as the plug passes between the contacts. Inasmuch as the material of the tape wrapped around the plug is electrically non-conductive, contacts 92 and 93 serve, in connection with electrical components hereinafter to be described, as a switch to sense an incomplete wrap or a missed wrap when the uncovered or untaped plug completes a circuit between the two contacts.

The released plug 10 falls into a chute 152 (FIGS. 10 and 11) which has a side branch 153 for conducting rejected, i.e., unwrapped, plugs to a reject container (not shown). A pivoted gate 154 operated by a chute solenoid 140 swings into chute 152 to divert the rejected plug into branch 153. A switch 141 having an arm 155 in chute 152 is actuated by a wrapped plug to actuate a counter and a reset coil of a stop relay as will be hereinafter described.

The fluid under pressure used to power the cylinders is preferably air such as is generally found in most factories. The fluid circuit is shown in FIG. 8 and comprises an intake pipe 98 which has one branch 99 supplying air under pressure to the tape wrapping machine and another branch 100 supplying air under pressure to the plug feed mechanism. The branch to the feed mechanism includes a filter 101 and a lubricator 102 after which the line is divided into three main branches for supplying air under pressure to cylinder 58, which drives rack 56 for rotating plunger 38, cylinder 59, which moves plunger 34 toward and away from the tape wrapper 14, and a cylinder 103 which, as shown in FIGS. 5 and 5A, actuates plunger 28 to move a plug from the receiving station 24 to the feed station 25 in the feed head 23. Each of the branches is provided with a pressure regulator 104 and a pressure indicator 105. Each of the cylinders 58, 59 and 103 is a double-acting cylinder and each is controlled by its own solenoid operated valve 106, 107 and 108, respectively. Each of the cylinders exhausts into a common pipe 109 and an exhaust muffler 110.

The electrical apparatus and the controls for operating the feed mechanism are shown in the circuit diagram of FIG. 9. In addition to the solenoids for the valves, the circuit includes a plug 111 for connecting the circuit to a 110-volt power source, a start switch 112, a stop switch 113, an on-off switch 114, a standard starter 115 and certain relays and other switches to be hereinafter described.

For a detailed description of the circuit diagram it may be assumed as a starting condition that switch 114 is in its "off" position, that the feed cycle is interrupted in a position where workpiece plug 10 is engaged by the hexagonal nonmagnetic head 43 at the end of plunger 34, cylinder 59 is exhausted, its rod 60 is moved forward from its fully retracted position, and its solenoid 108 is in neutral or deenergized condition. Cylinder 58 for operating rack 56 has moved rack 56 to its forward position and its solenoid is in energized condition. Cylinder 103, which may be termed hereinafter a shuttle cylinder, is also in its forward position wherein a workpiece plug has been moved into the feed position, the solenoid for the shuttle cylinder likewise being in a deenergized condition.

To start a new cycle under the assumed conditions, switch 114 is turned on and power is thus applied to the solenoid 108 which controls cylinder 59 to move the plunger 34 forward toward the tape wrapping machine 14. The forward movement of the piston rod 60 carries with it the disc 64 which is in contact with a switch 135 (FIGS. 1 and 3) and causes said switch to be closed. The closing of switch 135 causes a relay 117 to be energized. Further operation of the feed mechanism however is dependent upon the presence of a workpiece plug 10 on the surface 29 of the plunger 28 which it may be recalled moves the workpiece plug from its receiving station to its feed station. It may be recalled further that a plug in such position depresses a pin 30 which is used to close a switch 118 connected to relay 117 which is then held and latched in position through switch 119 thereof. Power is then applied to the solenoid 107 reverse coil 120 through the second switch 121 operated by relay 117 which is connected to the line or power source through the starter 115. This causes the parts shuttle cylinder 103 to operate in a reverse direction to pull the plunger 28 back to the position shown in FIG. 7A where it is in position to receive the next workpiece plug to be tape wrapped. When the plunger 28 reaches the position shown in FIG. 7A, the next workpiece plug 10 will drop down upon the pin 30 and move switch 118 to its opposite position. In moving to this position, the circuit is broken through the relay 117 so that this relay becomes deenergized and switch 119 is opened.

It is contemplated, as indicated above, that in production, the number of parts satisfactorily wrapped will be counted to provide a record of the production for the day, and to this end, a counter mechanism 122 is provided which is energized by the actuation of a switch 141 located in chute 152 downstream of the reject gate 154. Each energization of counter coil 123 causes the counter to advance by one number.

It is, of course, necessary that the operation of the feed mechanism be coordinated with the operation of the tape wrapping mechanism. Thus, it is not desirable to operate the cylinder 59 to retract plunger 34 until the tape wrapping operation is completed. Accordingly, there is shown in FIG. 9 in dotted outline a circuit 124 which is actually a part of the tape wrapping mechanism and includes a switch 125 operated by a rotating part (not shown) of the tape wrapper at the end of the tape wrapping operation, which, when so operated, reverses its contacts and energizes a relay 126, the said relay being held in pulled-up or energized condition through its latching switch 127. The latching switch 127 is in series with a switch 128 (FIGS. 7 and 7A) which is operated by a plunger 129 contacted by a workpiece plug 10 when the plunger 28 has transported the plug to its feed position 25. Through a second switch 130 in tape wrapper operated switch 125, cylinder 59 is held in its forward position through the energization of its forward solenoid coil 131.

At the conclusion of the tape wrapping operation, switch 125 is tripped to place relay 126 in energized condition. Power through said switch 125 and through the upper switch 132 of relay 126 is applied to the reverse coils 145, 146 of the solenoid operated valves for cylinders 58 and 59 to reverse the movement of these cylinders. During the retraction of cylinder 59, switch 116 is tripped, thereby interrupting the power to relay 117 which then becomes deenergized. The retraction of plunger 34 by cylinder 59 causes the workpiece plug to be stripped off plunger 34 and dropped into the portion of the finished parts chute formed by the insulated blocks 90 and 91.

The plug when released from the plunger and as it falls down the chute will pass the wire contacts 92 and 93 which constitute a sensing switch shown in FIG. 9 at 133. Sensing switch 133 will sense the presence of tape on the plug by means of the two exposed contact wires 92 and 93 attached to the walls of the insulating blocks 90 and 91, as the plug falls therebetween. If the tape is properly applied to the plug, no electrical contact is effected, that is, switch 133 remains open and the plug falls through the chute without obstruction into a receiving container. In the event the tape is missing from the plug, sensing switch 133 will make contact with the metal of the plug, thereby in effect closing said sensing switch 133, and will energize a relay 134 which is a low-voltage relay energized by a transformer 135. Switch 136 on relay 134 will hold the relay energized in a latched position after the sensing switch 133 has, in effect, been opened by the fall of the part through the switch.

The energization of relay 134 closes relay switch 137 which then energizes a stepping relay 138 to advance the switch 139 thereof one step. Said stepping relay 138 is the means by which the entire feeding operation is halted after a predetermined number of plugs has passed through sensing switch 133 without having been wrapped with tape. In the present machine, if five miswrapped or unwrapped parts in succession pass through the sensing switch 133, power to starter 10 will be interrupted and the entire feed mechanism will be shut off. If only one to four parts pass in miswrapped or unwrapped condition, power through relay 134 and its switch 137 is supplied power through relay 134 and its switch 137 is supplied to a solenoid 140 which is used to operate gate 154 for directing the miswrapped or unwrapped plug into side branch 153 and to a reject container.

If, after a miswrapped part has closed sensing switch 133, a properly wrapped part is sensed by the switch, that is switch 133 is not in effect closed, relay switch 141 will be energized by contact with the properly wrapped plug as the latter passes further down chute 152. Relay switch 141 will, in turn, energize the reset coil 142 of the step relay 138 and reset relay 138 retracts to its starting position. Relay switch 141 also energizes coil 123 of counter 122 to indicate the passage of a good part.

When the tape wrapper circuit 124 has been operated by the wrapping machine to close the righthand contact of a switch 143 forming part of tape wrapper switch 125, relay 126 is energized, which then energizes, through its switch 132, the return coils 144 and 145 of feed cylinder solenoid 108 and index cylinder solenoid 106, respectively, thereby retracting plunger 34 to the limit of its movement in that direction. This causes switch 116 to be tripped thereby opening the upper contacts 146 of said switch 116 and closing the lower contacts 147 thereof. The closing of contacts 147 energizes the advancing coil 148 of the solenoid 107 controlling the valve to the cylinder 103 for moving a plug from its receiving position to its feed position and the cylinder 103 is thus activated to move plunger 28 and the plug thereon to the right, as viewed in FIGS. 5 and 5A. The movement of plunger 28 to the right moves pin 129 contacted by the plug also to the right, as viewed in FIGS. 7 and 7A, thereby activating switch 128 to open said switch and interrupt the power to reverse coils 144 and 145 on the feed and index cylinder solenoids. The interruption of power to cylinder 59 allows spring 66 to become active to push plunger 34 against plug 10 in an effort to engage the head 43 of the plunger with recess 12 in the plug 10. Simultaneously, the forward coil 149 of the index relay 106 is energized thereby causing cylinder 158 to push rack 56 transversely of the plunger 34 and rotate the plunger through pinion 54 meshing with said rack. The rotation of plunger 34 and the endwise pressure on the plunger exerted by spring 66 insures the engagement of head 43 with recess 12, which results in an axial movement of disc 64 and a corresponding actuation of switch 116 contacted thereby, closing switch contacts 146 and energizing the forward coil 131 of the feed cylinder solenoid 108. This same operation of the switch interrupts the circuit to solenoid 107 to relax pressure on plunger 28 and plug 10. Plunger 34 with the plug 10 mounted thereon is thus moved forward into the work station in the wrapping machine 14 and the cycle is thereafter repeated.

Although the invention has been described with reference to its application to feeding threaded plugs to a tape wrapping machine, it is not limited to such application and can be used whenever it is desired to feed an article to a work station and hold it against rotation, the article or the feed mechanism having a polygonal recess into which a polygonal projection on the other part may project.

I claim:

1. Apparatus for feeding articles to a work station and retracting them therefrom, said apparatus comprising a feed head disposed in proximity to the work station, said head having an apertured feed station, means for holding an article in said apertured feed station, said article having at one end axially extending substantially flat walls in said aperture, plunger means reciprocable through said aperture toward said work station, means on the end of said plunger adapted to engage the walls on said article to support said article, and means for reciprocating said plunger and the article supported thereon to transport said article to the work station and retract it therefrom, said means for reciprocating said plunger comprising resilient means and fluid power means adapted to act in the same direction to move said plunger toward the work station, and means for sequentially activating the resilient means and the fluid power means.

2. Apparatus as described in claim 1, said means on the end of the plunger and said walls on the article defining in cross section interfitting polygons, means for rotating the plunger, said means for sequentially activating the resilient means comprising means for activating the resilient means while the plunger is rotating and means activated when the means on the end of the plunger engages the walls on the article to activate said fluid power means.

3. Apparatus as described in claim 1, said article being made of magnetic material, magnetic means on the plunger contacting said article and holding said article on said plunger, and means on the feed head movable behind the article on the retracting movement of said plunger to strip the article off the end of the plunger.

4. Apparatus as described in claim 3, and guide means pivoted on the feed head and controlled by the article for guiding the article in its movement after the article has been stripped from the article contacting and holding means.

5. Apparatus as described in claim 1, said fluid power means being double acting such that it also is operable in the opposite direction so as to act against said spring to energize said spring and hold said spring in compressed condition prior to movement of the plunger toward the work station, and means for energizing said fluid power means to operate said fluid power means in said opposite direction.

6. Apparatus as described in claim 5, said means for sequentially activating the resilient means comprising means for deenergizing said fluid power means when it has operated in said opposite direction whereby to allow said compressed resilient means to expand and thus to be activated.

* * * * *